United States Patent [19]

McGuffin

[11] 4,217,586
[45] Aug. 12, 1980

[54] CHANNEL ESTIMATING REFERENCE SIGNAL PROCESSOR FOR COMMUNICATION SYSTEM ADAPTIVE ANTENNAS

[75] Inventor: August L. McGuffin, Clinton, N.Y.

[73] Assignee: General Electric Company, Utica, N.Y.

[21] Appl. No.: 932,897

[22] Filed: Aug. 11, 1978

Related U.S. Application Data

[63] Continuation-in-part of Ser. No. 796,952, May 16, 1977, abandoned.

[51] Int. Cl.$^2$ .............................................. H04B 7/00
[52] U.S. Cl. ...................... 343/100 LE; 343/100 CL
[58] Field of Search .................. 343/100 LE, 100 CL; 325/305, 367, 371

[56] References Cited

U.S. PATENT DOCUMENTS

| | | | |
|---|---|---|---|
| 3,766,559 | 10/1973 | Butcher, Jr. et al. | 343/100 SA |
| 3,905,009 | 9/1975 | Hughes et al. | 340/6 R |
| 3,967,279 | 6/1976 | Zeger | 343/117 A |

OTHER PUBLICATIONS

McGuffin et al., *Multipath Spread-Spectrum Signal Identification for Adaptive Array Processing*, SI-646, a paper presented at Naecon 76, May 18-20-76, Dayton, Ohio.

*Primary Examiner*—Theodore M. Blum

[57] ABSTRACT

A spread spectrum communication adaptive array antenna processor is disclosed which can acquire and remain synchronized to a pseudo-noise (PN) signal transmitted in a multipath signal environment. The plurality of antennas which receive rf signals are individually associated with mixing circuitry which reduces the received signals to IF frequencies. The IF signals are fed into the adaptive filtering portion of the adaptive signal processor which contains circuits to generate an adaptive weight corresponding to each antenna element. An array signal is formed by summing the products of each IF signal with a filter weight corresponding to each antenna element generated within each respective adaptive loop. The adaptive signal processor utilizes the complex conjugate of the error feedback signal which is then multiplied by each respective IF signal. The complex conjugate of this integrated product forms each filter weight. A channel estimator generates an adaptive reference signal which inclues the essential multipath characteristics of the received signal. By using this reference signal in conjunction with the array signal generated by the adaptive filtering portion of the processor, the adaptive array can form an appropriate main beam without prior knowledge of the signal propagation direction.

6 Claims, 6 Drawing Figures

1

CHANNEL ESTIMATING REFERENCE SIGNAL PROCESSOR FOR COMMUNICATION SYSTEM ADAPTIVE ANTENNAS

It is noted that this application appears to claim subject matter disclosed in applicant's prior copending application Ser. No. 796,952, filed May 16, 1977 now abandoned. This application is a continuation-in-part of Ser. No. 796,952.

SUMMARY OF THE INVENTION

The presently disclosed invention overcomes two serious problems that are aggravated by the reception of multipath signals. First, the instant invention can be used to provide an adaptive array with information enabling it to form a beam towards signals from unknown directions of arrival in a multipath environment. Second, it will provide the communication modem with sufficient signal information during this transition period to permit the identification of the desired signal. The identification of the desired signal is an essential step in forming the appropriate main beam without prior knowledge of the signal propagation direction.

Accordingly, a primary object of the present invention is to achieve sufficient signal acquisition and reliable, uninterrupted operation of a spread spectrum communication adaptive array system. This objective is most significant when multipath signals are received by a communication system installed in a moving vehicle, especially a rapidly moving vehicle such as an aircraft, RPV or satellite. It is important, at least in some applications, to attain this goal without lengthening the signal acquisition phase of the operation. In those applications where acquisition problems exist, or where interrupted communications due to multipath signals may cause a mission to fail, this new technique solves an important problem.

BRIEF DESCRIPTION OF THE DRAWINGS

Various other objects, features and attendant advantages of the present invention will be more fully appreciated from the following detailed description when considered in connection with the accompanying drawings.

PREFERRED EMBODIMENTS OF THE INVENTION

Communications systems, particularly those carried by aircraft, RPV's or other moving vehicles, are required to acquire a desired signal arriving from an initially unknown direction in an adverse or severe jamming environment. Except for temporary excursions during acquisition, the adaptive array must provide higher gain in the direction of the desired signal than in directions from which intense interference is received. This requirement can be satisfied by an adaptive array processor capable of forming a main lobe in the signal propagation direction, where the signal direction is sensed by the interaction of the adaptive array with circuits associated with the identification and synchronization of the received spread spectrum code.

The adaptive array processors shown in the prior art do not provide a satisfactory method of acquiring and tracking signals in a multipath environment. In such an environment the received signal often consists of a set of resolvable components of the transmitted signal, each arriving at the receiver at a slightly different time, depending on the propagation path length of each component. Prior art antenna processors are capable of becoming synchronized to only one resolvable signal component at a time. A resolvable component generally consists of a subset of the received components such that the subset members have nearly the same propagation time. Fading occurs due to small changes of phase between subset members due to small changes in relative propagation time. Slow fading of the one synchronized component causes communications to be interrupted until another signal component is identified and acquired. The interruption continues until spread spectrum synchronization has been established again.

The instant invention overcomes this problem with an antenna array adaptive signal processor which generates an improved reference signal that contains components corresponding to each resolvable multipath signal.

Figure 1:
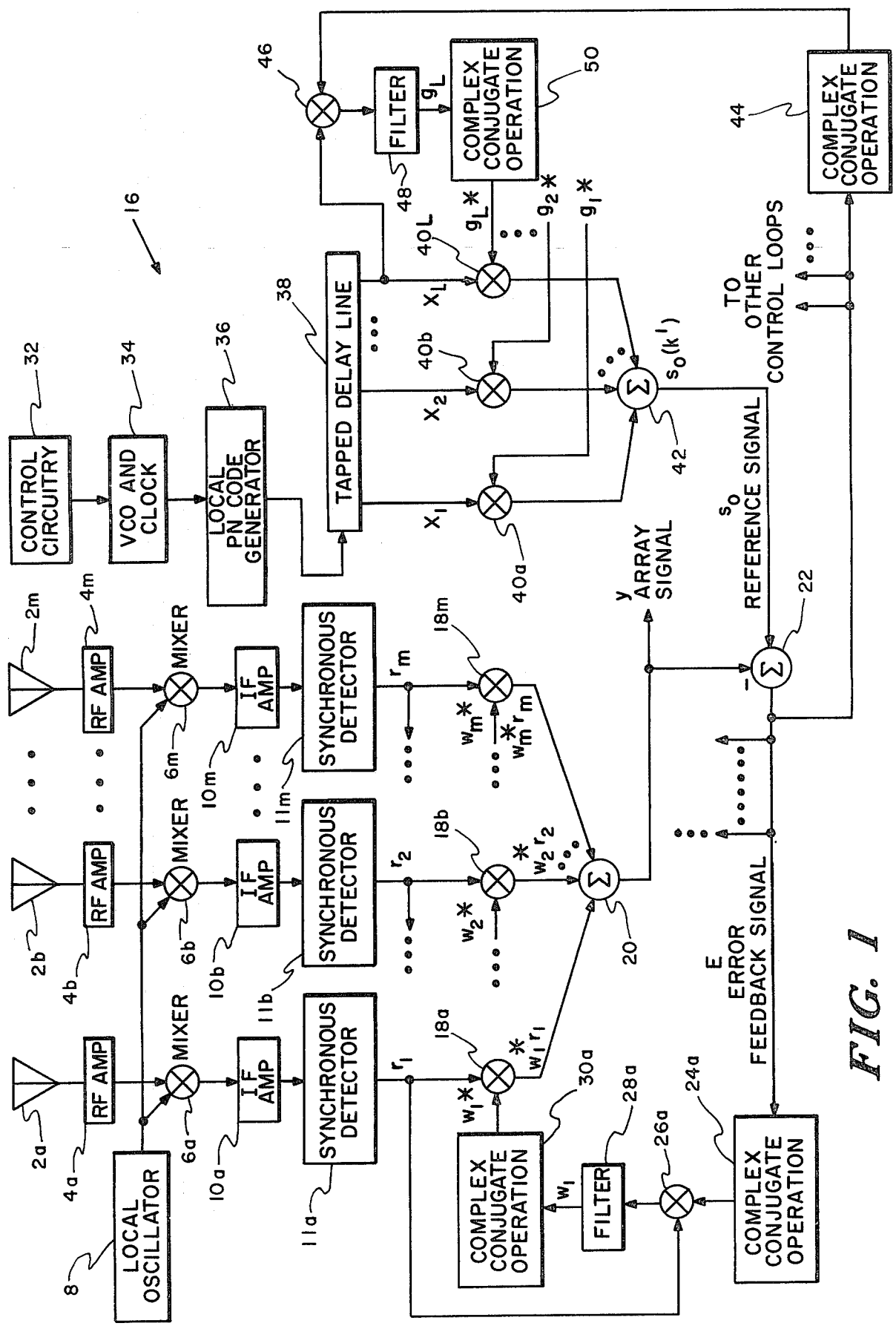
FIG. 1 is a block diagram including the combination of an adaptive filter and a channel estimator configured according to the present invention.

FIG. 1 represents a system constructed in accordance with the present invention. Although only three antenna elements have been shown, the invention is not limited to the use of any specific number of antenna elements e.g., m denotes the actual number of antennas for a given system and i corresponds to any one of the antenna elements. The received signal at each of antennas 2, is brought down to an IF signal after having been amplified by an rf amplifier 4, and mixed at mixer 6 by local oscillator 8. Each of the m signals is then amplified by an IF amplifier 10 and synchronously detected before entering the adaptive filtering portion 14 of the adaptive signal processor 12. Synchronous detector 11 forms a signal $r_i$ which is a complex envelope representation of the received signal.

The adaptive signal processor 12 is composed of an adaptive filtering portion 14 and a channel estimating portion 16. The adaptive filtering portion includes m adaptive filtering loops each corresponding to one of the received signals $r_i$. Each loop contains a multiplier 18, an adder 20 common to all loops and a subtractor 22 common to the adaptive filtering portion 14 as well as the channel estimating portion 16. Each loop further includes a complex conjugate operation device 24, a multiplier 26, an integrator 28 and another complex conjugate operation device 30.

Multiplier 18 forms the product between each received signal $r_i$ and each filter weight, $w_i^*$ (the asterisk denotes that a complex conjugate operation has been performed upon the weight $w_i$). Adder 20 forms the array signal, y, which represents the combination of all the products that have been formed by multipliers 18.

Subtractor 22 calculates the error feedback signal, E, by subtracting the array signal, y, from the reference signal, $s_o$. The error feedback signal will eventually approach zero as the channel estimator 16 and adaptive filtering portion 14 interact with one another as hereinafter delineated.

The complex conjugate operation device 24 forms the complex conjugate of the error feedback signal. In each of the m loops, the complex conjugate of the error feedback signal, $E^*$, is multiplied with each of the m received signals, $r_i$, by multiplier 26. This product is then integrated by integrator 28 to form each filter weight, $w_i$. The complex conjugate operation device 30 merely forms the complex conjugate of the filter weight, $w_i^*$.

The channel estimating portion 16 consists of a local PN code generator 36, controlled by control circuitry 32 and timed by the VCO& clock 34. The operation of control circuitry 32 has been patterned after the synchronization techniques which have been described in many technical articles e.g., "Acquisition of Pseudonoise Signals by Sequential Estimation" by Robert B. Ward, *I.E.E.E. Transactions on Communications Technology*, December 1965. More specifically, the synchronization and acquisition techniques shown in the Ward article is similar to the operation of control circuitry 32 in that the control circuitry starts out by loading the receiver sequence generator (tapped delay line 38 via local PN code generator 36) with a best estimate of a binary code and then if a low cross-correlation has been obtained, a new estimate of the input will be made (as generated by local PN code generator 36), loaded (into tapped delay line 38) and tracking of the code will again be attempted. Local PN code generator 36 could be designed according to Chapter 3 of the text *Spread Spectrum Systems*, by R. C. Dixon, John Wiley & Son, Inc., 1976 (and more specifically pages 59–64).

The PN code signal which has been generated is fed into tapped delay line 38. The plurality of taps located on the delay line each have their own separate loop that adaptively forms a tap gain weight $g_1$. Although only three taps have been shown in FIG. 1, the invention is not limited to the use of any specific number of taps e.g., L denotes the actual number of such taps in a given system and 1 corresponds to any one of the taps.

The signal at each delay line tap $x_1$, is multiplied by each tap gain weight $g_1^*$ by multiplier 40. Adder 42 forms the reference signal, $s_o$, by combining all the products that have been formed by multipliers 40. Subtractor 22 calculates the error feedback signal, E, by subtracting the array signal, y, from the reference signal, $s_o$. The complex conjugate operation device 44 forms the complex conjugate of the error feedback signal. In each of the L loops, the complex conjugate of the error feedback signal, $E^*$, is multiplied with each of the L signals at each delay line tap, $x_1$, by multiplier 46. This product is then integrated by integrator 48 to form each tap gain weight, $g_1$. The complex conjugate operation device 50 merely forms $g_1$, the complex conjugate of the tap gain weight.

In order to fully appreciate the instant invention its operation will be delineated first in an environment which contains no multipath signals, and then in an environment in which multipath signals exist. When no multipath signals accompany the direct signal, $r_i$, incident upon each of m elements of the antenna array, the error signal, E, can be expressed by the mathematical relationship:

$$E = s_o - y \tag{1}$$

$$E = s_o - \sum_{i=1}^{m} w_i^* r_i \tag{2}$$

$$E = s_o - \sum_{i=1}^{m} w_i^* s_i - \sum_{i=1}^{m} w_i^* z_i - \sum_{i=1}^{m} w_i^* n_i \tag{3}$$

where $s_i$, and $n_i$, are the desired signal, the interference, and the receiver noise, respectively, observed at the ith antenna array element. The reference signal is $s_o$. The adaptive array processor controls the adaptive weights, $w_1, w_2 \ldots w_m$, so as to minimize the mean square value of the error signal, E.

To minimize the mean square error, the adaptive processor must reduce the two components of the error, i.e., the interference and the signal error, indicated by the summations:

$$\text{Interference} = \sum_{i=1}^{m} w_i^* z_i \tag{4}$$

$$\text{Signal Error} = s_o - \sum_{i=1}^{m} w_i^* s_i \tag{5}$$

without permitting an objectionable degree of increase in the receiver noise at the adaptive array output terminals, where $$\text{Receiver Noise Voltage} = \sum_{i=1}^{m} w_i^* n_i \tag{6}$$

When no significant multipath reflections of the desired signal are present, then satisfactory reduction of the mean square (desired) signal error (i.e., of the mean square value of (3) occurs if a beam is formed in the direction of the signal whose element components are $s_1, s_2, \ldots s_m$, the desired signal components. To provide a simple example, it is assumed that the number of degrees of freedom needed to null the sidelobe pattern and minimize the variance $$\sum_{i=1}^{m} w_i^* z_i$$

in equation 3 is small compared with the number of degrees of freedom of the adaptive array processor. Consequently, the error associated with the desired signal, denoted by $E_d$ as:

$$E_d = s_o - \sum_{i=1}^{m} w_i^* s_i \tag{7}$$

is minimized approximately as if only the desired signal and receiver noise were present.

As a specific example, if the antenna array has only three elements, then the desired signal error can be expressed as:

$$E_d = s_o - w_1^* s_1 - w_2^* s_2 - w_3^* s_3 \tag{8}$$

with $$s_1 = \frac{1}{\sqrt{3}} s_o \epsilon^{-j\phi} \tag{9}$$

$$s_2 = \frac{1}{\sqrt{3}} s_o$$

$$s_3 = \frac{1}{\sqrt{3}} s_o e^{j\phi}$$

where $-\phi$, $0$, and $\phi$ are phase shifts at each of three antenna elements due to signal direction of arrival. Here the signal is deterministic. The adaptive array processor will compute values for the weights which will tend to minimize $E_d$ which can now be expressed as:

$$E_d = s_o - \frac{s_o}{\sqrt{3}} [w_1^* \epsilon^{-j\phi} + w_2^* + w_3^* e^{j\phi}] \quad (10)$$

Since the magnitudes of w1, w2 and w3 should be small to avoid an undesirable increase in the receiver noise, i.e., of the summation $$\sum_{i=1}^{m} w_i n_i,$$

the adaptive processor tends to avoid any substantial increase of the weight magnitudes as it minimizes the signal error. This corresponds to minimizing equation 10 mainly by adjusting the phases of w1, w2 and w3. Therefore, the complex conjugates of the weights will tend to approach the values $$w_1^* = \frac{1}{\sqrt{3}} e^{j\phi} \quad (11)$$

$$w_2^* = \frac{1}{\sqrt{3}}$$

$$w_3^* = \frac{1}{\sqrt{3}} \epsilon^{-j\phi}$$

The approximate weights given by equation 11 are the weights which will form a beam in the direction of arrival of the signal represented by $s_1$, $s_2$ and $s_3$. A significant deviation from these values may occur, depending on the available degrees of freedom and the signal environment, but adequate adaptive array gain in the desired look direction is ordinarily maintained when a suitable reference is available.

When multipath signal components are received, the signal error has additional terms not given in equation 5. Except when the envelope delays of the additional indirect (reflected) signal components are quite small, the associated (additional) weighted signal summations cannot be subtracted from the reference signal, $s_o$, to reduce the mean square signal error. Alternatively, the adaptive array may generate a reference signal having an apparent envelope delay of an indirect signal component. In this case, the direct signal and other reflections cannot be reduced suitably by the subtraction indicated in equations 3, 5 and 7.

More specifically, when there are two multipath reflections of the transmitted signal, equation 7 becomes:

$$E_d = s_o - \sum_{i=1}^{m} w_i^* s_i(t) - \quad (12)$$

$$\Gamma_1 \sum_{i=1}^{m} w_i^* s_i(t - \tau_1) - \Gamma_2 \sum_{i=1}^{m} w_i^* s_i(t - \tau_2)$$

Where $\Gamma_1$ and $\Gamma_2$ are reflection coefficients and $\tau_1$ and $\tau_2$ are the associated propagation delays. Here the delays are such that the reflected components are resolvable in time from each other and from the direct signal. Therefore, the envelope delays of the direct and indirect signal terms in equation 12 are great enough so that only one of the three terms can be satisfactorily subtracted from $s_o$ by adjusting either the adaptive weights or the relative delay of $s_o$ and the received signal.

That is, either $$s_o - \sum_{i=1}^{m} w_i^* s_i(\tau) \quad (13)$$

or $$s_o - \Gamma_1 \sum_{i=1}^{m} w_i^* s_i(t - \tau_1) \quad (14)$$

or $$s_o - \Gamma_2 \sum_{i=1}^{m} w_i^* s_i(t - \tau_2) \quad (15)$$

can be minimized, but the remaining two terms will generally remain in the error feedback to the adaptive array.

In order to overcome this problem, the reference signal, $s_o$, should have components corresponding to the principal resolvable multipath components of the desired signal, otherwise, the additional terms appearing in equation 12 will tend to cause degraded beam formation and loss of synchronization.

Prior art synchronization and reference signal generation techniques are such that typically only one of the received coded signals, either a direct or reflected signal, is minimized in the error feedback. This occurs because the system can synchronize only to one spread spectrum code, and the reference signal generated is based only on that one signal component.

Figure 2:
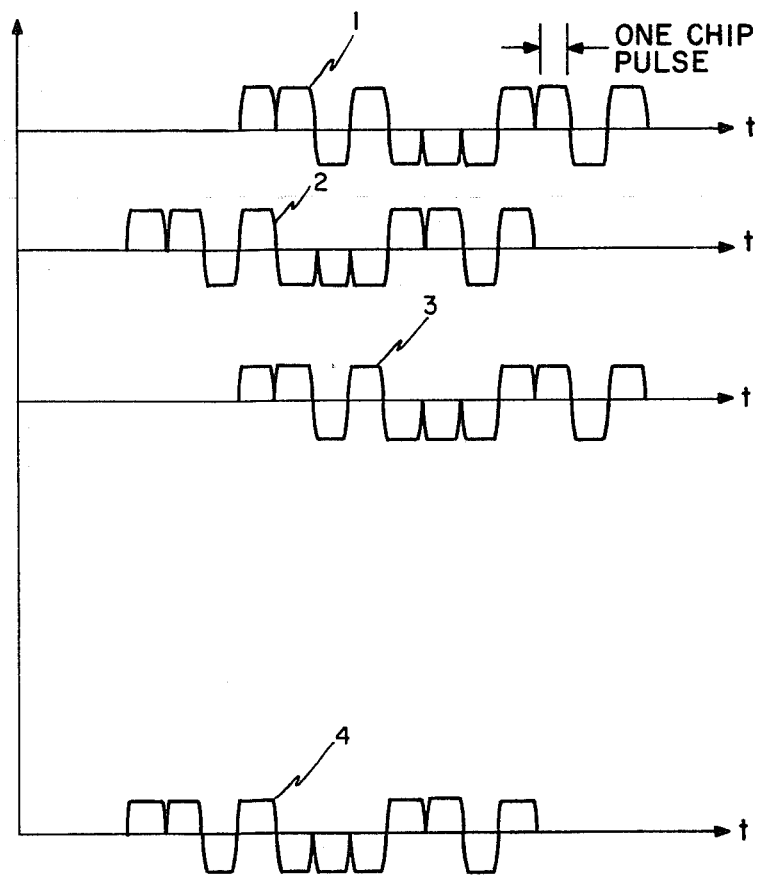
FIG. 2 illustrates a number of waveforms which exemplify the multipath problem.

FIG. 2 illustrates a number of waveforms which will exemplify the multipath problem. The PN code generated by local PN code generator 36 in FIG. 1 is shown as curve 1, and curves 2 and 3 of FIG. 2 represent a direct and indirect or multipath signal component, respectively of the array signal, y. The PN codes have the characteristic that if two code signals (x(t)&x(t-$\tau$) have a relative delay greater than the duration of one chip pulse, they are not only resolvable but also uncorrelated. Consequently, processing gain is realized only with one (curve 3) of the two code components timed as indicated with curves 2 and 3. In this example, the system becomes synchronized only to the multipath component of the signal shown by curve 3. Only the multipath component is subsequently subtracted from the array signal at subtractor 22. Therefore, the direct signal component shown in FIG. 2 as curve 2 remains in the error feedback signal, as illustrated with curve 4, as an incorrect indication to the adaptive array processor that the direct signal component is an unwanted interfering signal. After incorrectly identifying the direct signal component as an unwanted interfering signal, the prior art adaptive array processors would adjust their weights, $w_i$, to attentuate that signal, instead of utilizing it to improve system performance as the present invention does. Since a coded data pulse may have several hundred or more chip pulses, ample "opportunities" for such uncancelled coded pulses to occur in the error feedback exist when multipathh signals are received.

The instant invention by constructing an improved reference signal, has components corresponding to each resolvable received multipath signal, as well as the direct signal component.

The tap gain weights $g_1^*, g_2^*, \ldots g_L^*$, are adjusted by the channel estimating portion 16 to also minimize the error signal, E. (Sampled data circuits are assumed, so that hereinafter the error signal will be presented by $E(k)$ where k denotes $t_k$, the time at which the kth sample is observed.) To minimize $E(k)$, the tap weights must become proportional to the resolvable reflection coefficients of the incoming multipath signals. Consequently, the action of this temporal adaptive processor is such that the reference signal $S_o(k)$, becomes a replica of the sum of the direct and reflected coded signals being received. Moreover, the adaptive tap gains are such that each local code component (or non-zero tap output) is automatically aligned in time (delay) with the appropriate coded multipath signal component.

To continue with the example, a signal reflection multipath condition is still assumed. In this case, the array signal can be represented as:

$$y(k) = h_o x(k) + h_j x(k-j) + z(k) + n(k) \qquad (16)$$

where
- $h_o$ = gain of the direct path
- $h_j$ = gain for the reflected signal delayed by j tap intervals
- $x(k)$ = direct code component
- $x(k-j)$ = indirect (reflected) code component
- $n(k)$ = receiver noise
- $z(k)$ = partially canceled interference noise The initial local code, $x(k')$, has a delay error of $k'-k$ seconds. As the adaptive processor converges, the adaptive tap gains approach values such that the reference signal takes the form $$s_o(k) = g_p^* x(k'-p) + g_{p+j}^* x(k'-p-j) \qquad (17)$$

$$s_o(k) \approx h_o x(k) + h_j x(k-j) \qquad (18)$$

Clearly, the tap gains become approximately $$g_p^* \approx h_o$$

$$g_{p+j}^* \approx h_j \qquad (19)$$

$$g_n^* = 0 \text{ at other taps}$$

Also, the taps where non-zero tap gains occur are such that $$k'-p=k \qquad (20)$$

(and, of course, $k'-p-j=k-j$)

Equations 17–20 show that a reference signal component is generated for each resolvable multipath component of the received signal. Consequently, an additional reference signal term is added to equations 1–3, and 5 for each additional received (desired) signal component due to multipath propagation. Since the respective envelope delays are automatically aligned by the temporal adaptive processor, satisfactory subtraction is possible.

The resultant reference signal and error feedback signal have the following desirable characteristics:
1. All significant signal energy is removed from the error feedback signal.
2. Synchronization occurs at the correct temporal alignment of the reference code and the significant, resolvable components of the received code.
3. The adaptive tap gain weights, $g_1$, represent an estimate of the channel characteristics.

Due to the first characteristic, the main beam degradation of prior art techniques is avoided. Moreover, the second characteristic indicates that loss of synchronization is not likely unless all desired signal components, direct and reflected, fade simultaneously. The importance of the third characteristic is that in some applications it may well be desirable to observe the tap weights for signal detection purposes.

If the tapped delay line 38 has a delay greater than the maximum multipath delay, then the local PN code, $x(k')$, may either lead or lag the received code, $x(k)$, when synchronization occurs. This is possible because the adaptive tap weights automatically accommodate the delay error by permitting non-zero tap output signals only at relative delays that minimize code (signal) energy in the error feedback. Therefore, selecting a longer tapped delay line permits synchronization with a greater delay error between the received code and the local code as observed at the local PN code generator terminals. As the delay window becomes larger, the average time for synchronization tends to decrease.

A control system is required to adjust the local clock 34 to within the acceptable delay window. Apparently, use of the adaptive tap weights (or the absence of weights when outside the delay window) provides much of the information needed for this control.

Figure 3:
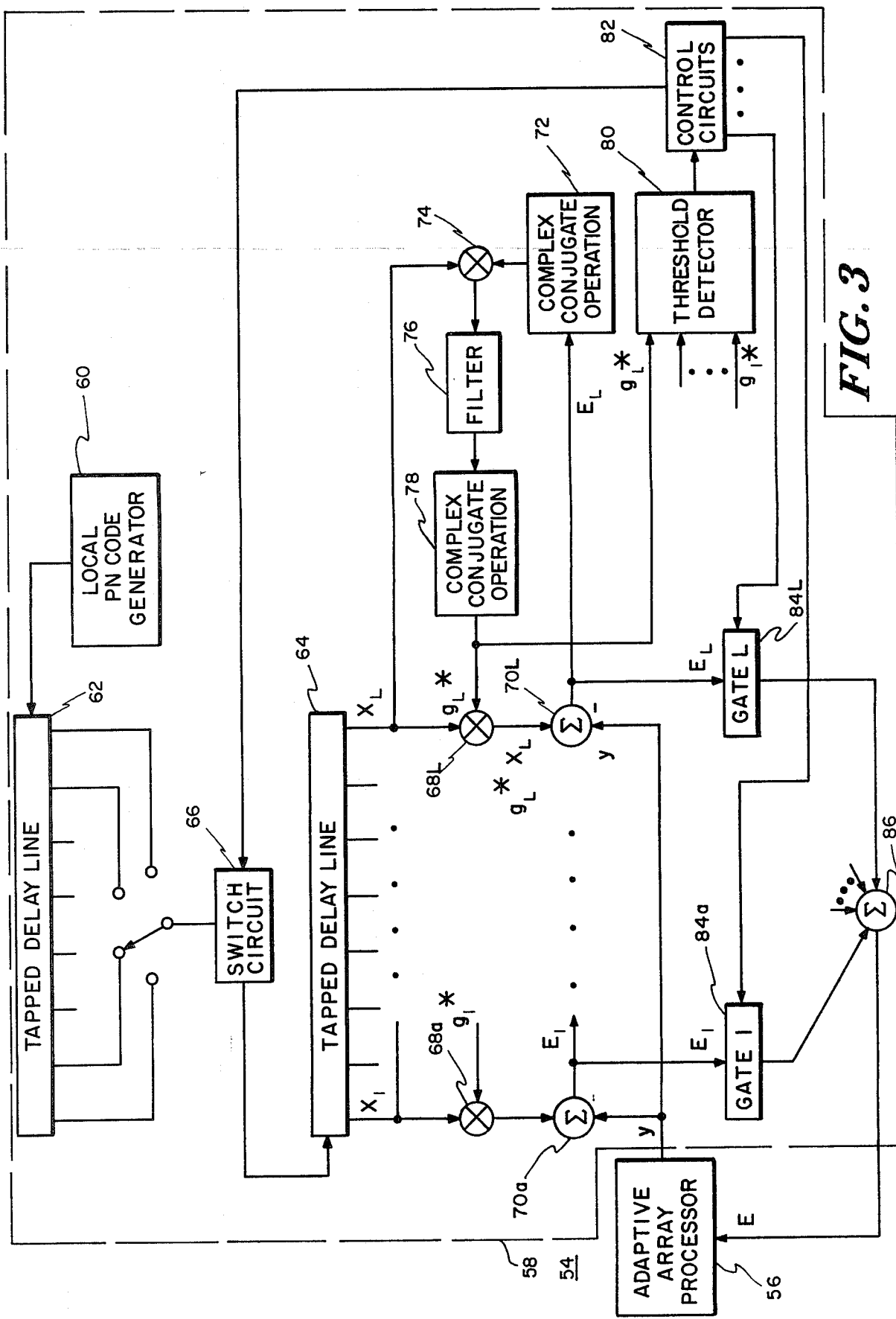
FIG. 3 is a system block diagram that is a modified configuration of the invention disclosed in FIG. 1 which includes additional circuitry to more adequately conduct the acquisition search function.

FIG. 3 represents a system block diagram that is a modified configuration of the invention disclosed in FIG. 1.

This modified adaptive signal processor system 54 is composed of a modified channel estimating portion called the adaptive reference signal generator 58 and an adaptive array processor 56 which is similar to the adaptive filtering portion 14 shown in FIG. 1. The channel estimating portion 58 incorporates the use of individual subtractors 70 in each of the L loops of the channel estimating portion 16 instead of the single subtractor 22 as shown in FIG. 1, in order to reduce the correlation noise. When all the gates 84 are open, the error feedback signal, E, to the adaptive array processor 56 is the summation of all the $E_1$, or $$E = \sum_{l=1}^{L} E_l.$$

In this case the result is practically the same as that of the FIG. 1 configuration, but faster convergence can now be obtained. The reduction in correlation noise is quite advantageous because it now permits the acquisition of weaker desired signals.

With continued reference to FIG. 3, the PN code expected to have been received is generated by the local PN code generator 60 and fed into tapped delay line 62. Selector switch 66 co-operates with tapped delay lines 62 and 64 to more quickly synchronize the local PN code with the PN code present in the received signal. The plurality of taps located on tapped delay line 64 each have their own separate loop that adaptively forms a tap gain weight $g_1$. The signal at each delay line tap $x_1$, is multiplied by each tap gain weight, $g_1^*$ by multiplier 68. Subtractor 70 calculates the loop error feedback signal, $E_1$, by subtracting the array signal, y, from the product $g_1^* x_1$. The complex conjugate operation device 72 forms the complex conjugate of the loop error feedback signal. In each of the L loops, the complex conjugate of the loop error feedback signal, $E_1^*$, is multiplied with each of the L signals, $x_1$, at each delay line tap, by multiplier 74. This product is then integrated by integrator 76 to form each tap gain weight $g_1$. The complex conjugate operation device 78 merely forms $g_1^*$ the complex conjugate of the tap gain weight.

The threshold detector 80 accepts all the complex conjugates of the tap gain weights and calculates or threshold value $g_T$ where, $$g_T = \frac{|g_1^*|^2 + |g_2^*|^2 + \ldots + |g_L^*|^2}{L} \quad (21)$$

Control circuitry 82 will leave open any respective gates 84 located in the same loop as the complex conjugate tap gain weight, $g_1^*$, whose squared magnitude is greater than a threshold value $g_t'$, proportional to $g_T$. In addition, it may be desirable to leave open adjacent gates to each gate having a gain weight whose squared magnitude is greater than a threshold value proportional to $g_T$.

Only those loop error feedback signals, $E_1$, associated with complex conjugate tap gain weights, whose squared magnitude, $|g_1^*|^2$ value exceeds the threshold value $g_T'$ will be used to form the error feedback signal, E. Control circuitry 82 controls gates 84 so that only the loop error feedback signals $E_1$, corresponding to loops whose squared magnitude tap gain weights have exceeded the threshold value will be allowed to flow to summer 86. The error feedback signal, E, is then calculated by summer 86 as it forms the sum of all the loop error feedback signals which were allowed to pass through the gates 84. The adaptive array processor 56 utilizes the error feedback signal in the same manner as the adaptive filtering portion 14 shown in FIG. 1.

Adequate acquisition and control circuitry is necessary because there may be an uncertainty in the knowledge of the relative delay of timing of the local PN code and the PN code present in the received signal. If the delay error of the local code is less than the total delay of tapped delay line 64, then signal acquisition and reference signal generation can occur. Regardless of which taps of delay line 64, correspond to the PN code timing in the received signal, cross correlation will occur and channel identification and signal estimation will ordinarily follow.

If the relative delay (local code delay) uncertainty is greater than the total delay of tapped delay line 64, a search sequence can be employed to find the approximately correct delay. The search is simplified by the delay window of acquisition, an interval equal to the total delay of tapped delay line 64, which permits a faster search than permitted by the use of a simple delay lock loop. For example, the maximum number of trials equals the ratio of delay line 62 to the delay of delay line 64. If the same correlation filter is employed in a simple delay lock loop, the maximum number of trials equals the number of chips stored in delay line 62.

One method of implementing the delay search is presented in FIG. 3. The local code is fed into tapped delay line 62, a line having a total delay equal to or greater than the delay uncertainty. The taps of delay line 62 are spaced at delay intervals equal to (or slightly less) than the total delay of delay line 64. Therefore, a selector switch can change the effective local code timing, or the delay from the local code generator to each tap in delay line 64.

The correct relative delay permits cross correlation to proceed and, consequently, is manifested by an increase in magnitude of those adaptive tap weights, $g_1$, corresponding to local code delays, which coincide with timing of received PN code components. The cell-averaging threshold detector 80 compares the squared magnitude of each adaptive tap weight with the mean square of all tap weights, thus providing a means of determining when to stop the search. A very high false alarm rate is selected for this detection.

In some applications it may be desirable to utilize the detection of tap weights to control the formation of the error feedback signal, $E_1$, to reduce the correlation noise in the adaptive array processor 56. After an initial filtering interval during which $$E = \sum_{l=1}^{L} E_l$$

some of the gates can be closed. Those gates corresponding to those $g_1$ which exceed the preliminary detection threshold remain open. Other gates, however, merely add unwanted noiselike signals to the error feedback signal, E. Therefore, most gates where tentative detection evidence does not occur are closed. A policy of randomly opening a few of such gates is desirable to increase the probability of finding all useful components of the desired signal.

Figure 6:
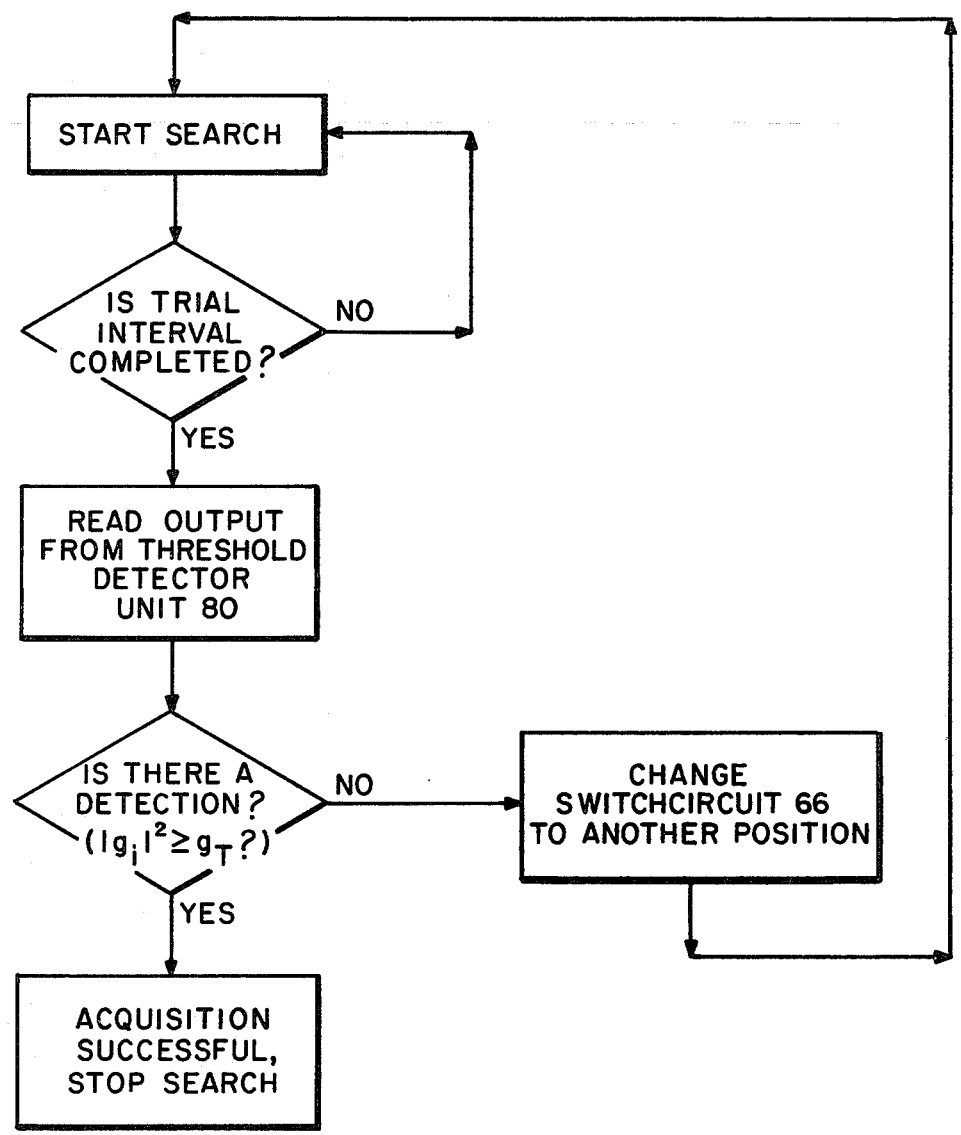
FIG. 6 is a functional block diagram representing those functions that are performed by control circuit 82.

The principal function of control circuits 82 is to perform certain operations or tasks associated with the signal acquisition sequence as illustrated in FIG. 6. These operations depend on preliminary detection data as well as on a predetermined acquisition sequence and related logic operations of the spread spectrum system. The subset of such operations directly related to this invention are concerned primarily with the use of preliminary detection data available from threshold detector 80 to cause the local code timing (or delay) to be changed and, in some applications, to actuate the set of gates 84a through 84l. The gates may then modify the feedback to the adaptive array.

Prior art includes methods of generating PN spreading codes which are non-repeating and unambiguous for time periods of tens of hours. Also included in the prior art are a variety of approaches to implementing a small timing correction of the local code often needed for signal acquisition and code synchronization.

Control circuits 82 should affect local code delay or timing only if a change greater than the delay of delay line 64 is required during the acquisition sequence. As discussed previously this invention provides a capability of accommodating small timing errors by means of adaptation to signals within the delay window determined by delay line 64.

The part of signal acquisition of interest here consists of a sequence of attempts to detect the desired signal, each conducted at a different trial delay of the local code. Each attempt occupies a time interval of specified duration.

At the end of each trial interval, preliminary detection data is furnished to the control circuits 82, from threshold detector 80. As previously discussed, threshold detector 80 detects any tap gain weight, $g_L$, which crosses (exceeds) the threshold $g_T$. The data transferred to the control circuits indicates which tap gains and, consequently, which taps of delay line 64 correspond to threshold crossings (or preliminary detections). If no detection has occured, this is also apparent from the data.

Those tap gains whose magnitude is increased substantially during a trial interval represents estimates of magnitudes of desired (coded) signals being received. If the PN code at some tap of delay line 64 is correlated with PN code in the received signal, then the associated adaptive loop forms a tap gain such that the product of the tap gain ($g_L^*$) and the tap PN code ($X_L$) equals the correlated received PN code. This is the result of minimizing the associated tap error signal, $E_L$. An essential consequence of this adaptive filtering is that the tap gain weight so enhanced is virtually equal to the received signal after demodulation has been conducted.

The control circuits 82 respond to the detection data when a given trial interval is terminated. If a preliminary detection has occured, no change is made in the tap switch controlled by switch circuit 66. This outcome indicates the probable presence of a desired signal. If a message is then received (and confirmed), the acquisition has been successful. If no detection is reported, then the control circuits transfer a command signal to switch circuit 66 causing a new tap of delay line 62 to be connected to the input of delay line 64.

In this manner the acquisition sequence continues until either the message is received or until the acquisition attempt is terminated.

In some applications control circuits 82 may be configured to close some of the gates, 84a-84l, which correspond to certain delay line 64 taps. This may be programmed to occur after a preliminary detection. As discussed previously gates corresponding to desired signal timing or within several taps of such timing remain open. The resulting feedback to the adaptive array contains less low level, extraneous PN code. Consequently, the effective correlator noise is diminished, and beam forming by the adaptive array becomes possible with weaker desired signals.

The adaptive reference signal generator 58 can be interconnected with several alternative adaptive antenna processor configurations. Although the essential reference signal characteristics and attendant performance can be achieved in each case, the degree to which optimal performance is approximated varies somewhat, depending on the convergence characteristics of the adaptive antenna processor algorithm. For example, simple steepest descent configurations, e.g., the LMS algorithm, do not necessarily provide as much "main beam" gain (signal direction gain) as can be obtained with more sophisticated algorithms.

When very good performance is desired, a time varying matrix can be implemented as part of the adaptive array processor 56. A discrete time version of the resulting adaptive array algorithm is $$w_{k+1} = w_k + Q_{k-1} r_k (\hat{s}_{ok} - r_k^{40} w_k) \tag{22}$$

$Q_{k-1}$ = an iteratively computed (or filtered) gain matrix
$r_k$ = vector of the aggregate of signals and noise observed at each element of the array antenna
$r'_k$ = the conjugate transpose of the vector $r_k$.
$\hat{s}_{ok}$ = the complex conjugate of the reference signal
$w_k$ = adaptive weight vector The matrix $Q_{k-1}$ is updated according to the relation $$Q_k = Q_{k-1} - \frac{Q_{k-1} r_k r_k' Q_{k-1}}{\frac{1-\mu}{\mu} + r_k' Q_{k-1} r_k} \tag{23}$$

$(0 < \mu < 1)$ where: $\mu$ = parameter determined by the allowable weight noise.

It is feasible to employ either analog or digital circuits to implement the adaptive array processor determined by equations 22 and 23. When analog circuits are preferred, it is convenient to choose discrete-time analog circuit elements, such as charge coupled devices and charge transfer devices, to store the gain matrix data.

Equation 22 applies to this implementation as long as the iteration rate of that equation is at least as fast as the Nyquist sampling rate of the received (observed) signals (denoted by the vector $r_k$).

One useful simplification is to update the matrixes $Q_k$ at a rate slower than the iteration rate. For example, $Q_k$ can be updated every tenth iteration.

In this case $Q_{(k-10)}$ remains as the given vector in (22) during the time interval $k-q \leq t_k \leq k$. The practical advantage is that either slower circuits or, with the addition of time multiplexing, fewer circuits are required.

The performance of this alternative is excellent, but additional convergence time is required compared with the faster gain matrix updating approach.

Figure 4:
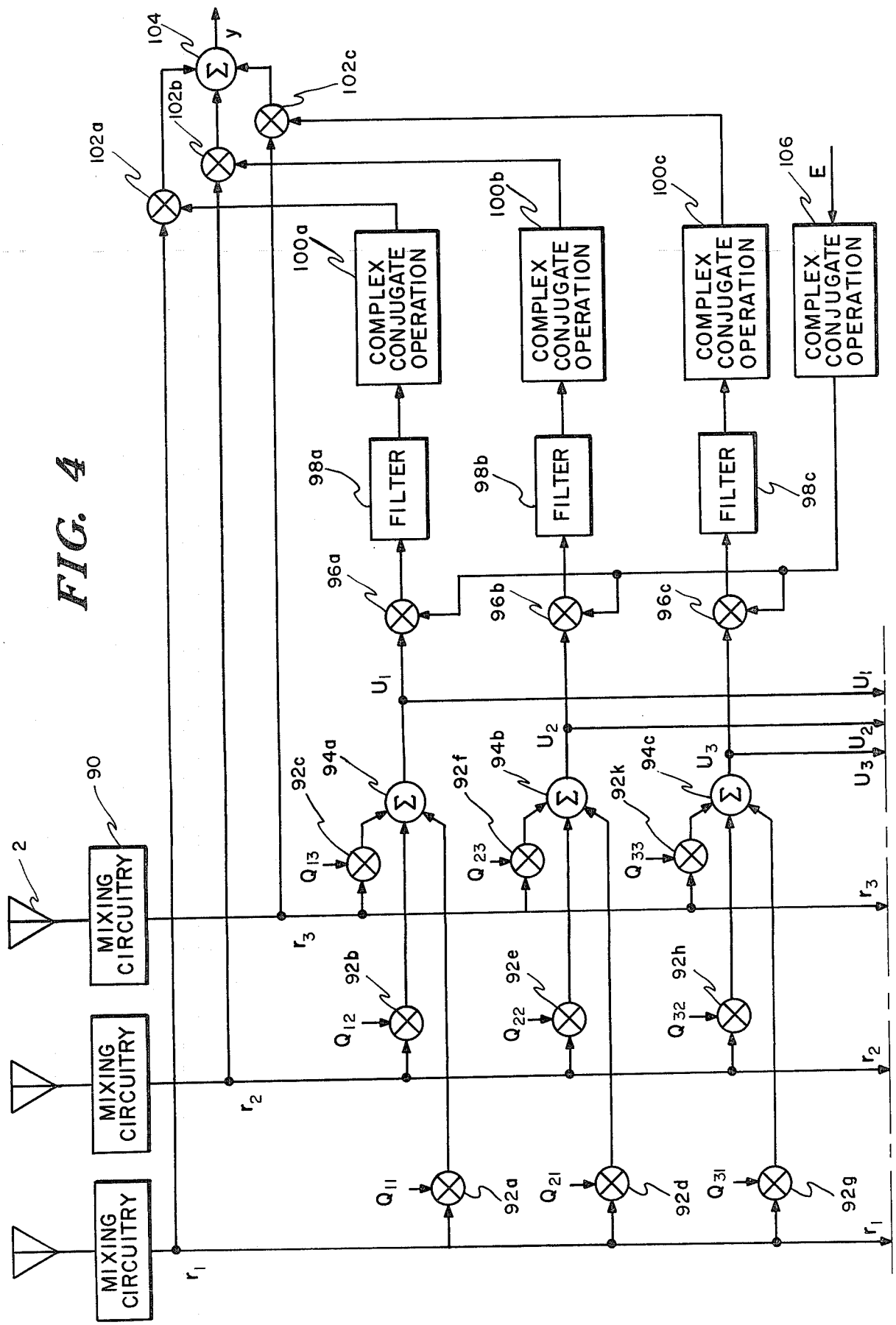
FIG. 4 is a block diagram of adaptive array processor 56 configured for a time varying gain matrix approach.

FIG. 4 is a block diagram for the adaptaive array processor 56 configured for the time varying gain matrix approach using only 3 antenna signals for ease of description. The mixing circuitry 90 includes rf amplifier 4, mixer 6, load oscillator 8, IF amplifier 10, and synchronous detector 11 which are shown in FIG. 1. Multiplier 92 form the products of each signal $r_i$, and the appropriate weighting element ($Q_{ij}$) of the gain matrix. Summers 94 accumulate the sum $U_i$, of 3 of the products corresponding to the weighting elements in the same row of the gain matrix. Each signal $U_i$ is then multiplied by the complex conjugate of the error signal, E, at multiplier 96 and filtered by filter 98. The complex conjugate of the output of filter 98 is then formed by complex conjugate operation 100 and then multiplied by each signal $r_i$ at multiplier 102. Summer 104 accumulates the total of these products and thereby forms the array signal, y.

Figure 5:
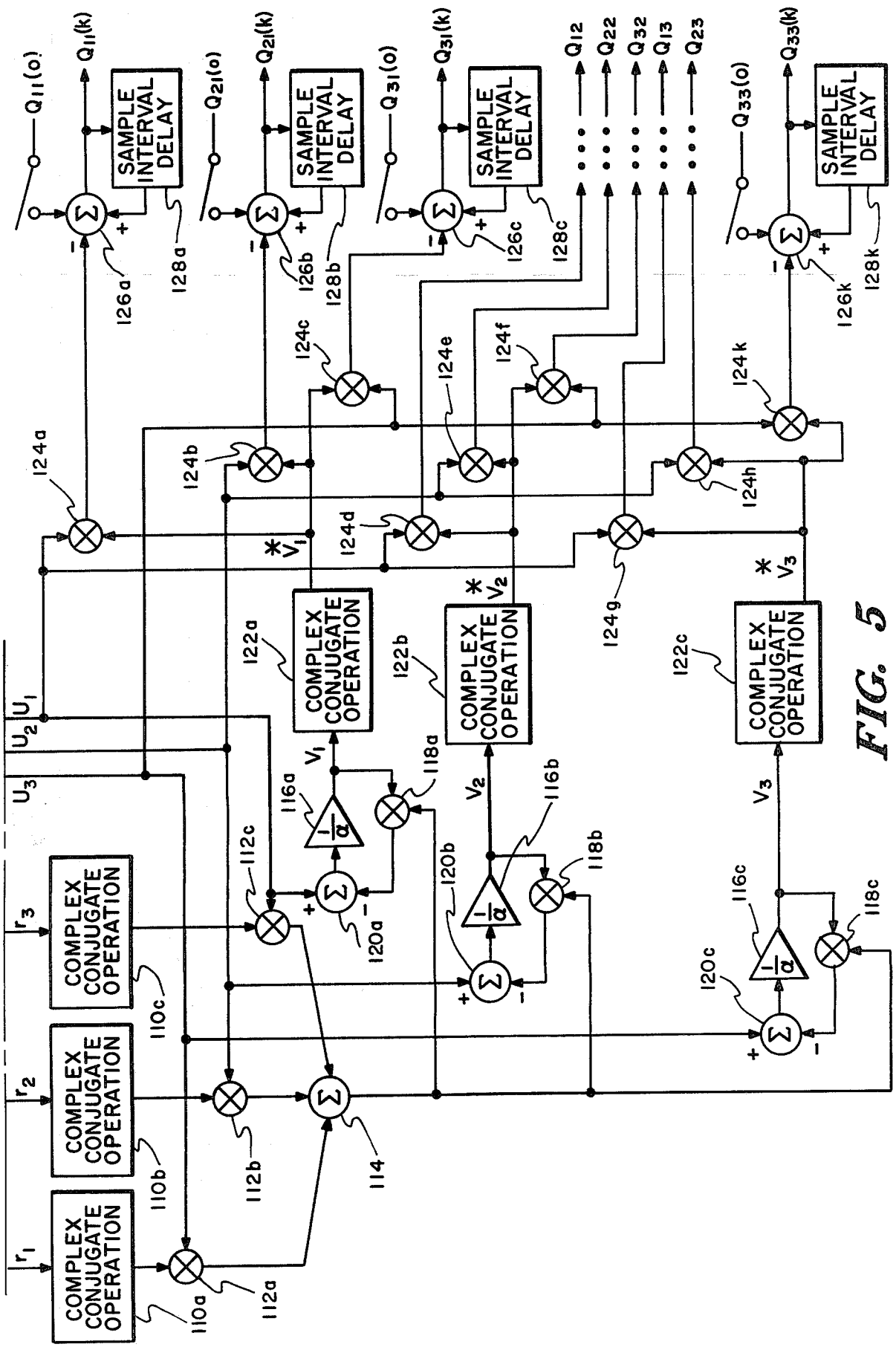
FIG. 5 is a block diagram representing one of the ways in which the values of the individual weighting elements of the gain matrix can be calculated.

FIG. 5 shows one of the ways that can be implemented to calculate the values of the individual weighting elements of the gain matrix. Each of the input signals $r_i$ are fed into complex conjugate operation 110, and respectively multiplied by each $U_i$ signal at multiplier 112. The sum of these products is formed at summer 114. Each signal $U_i$ is then used to create a signal $V_i$ at the output of amplifier 116. This is accomplished by first forming the product of the output of summer 114 and the signal $V_i$ at multiplier 118. This product is then subtracted from the signal $U_i$ at summer 120 to yield a different signal that is amplified by amplifier 116 to yield the signal $V_i$. Notice that the gain of amplifier 116 is $1/\alpha$ where, $$\alpha = (1-\mu)/\mu \tag{24}$$

Complex conjugate operation 122 is used to form the signal $V_i^*$. The product of each $V_i^*$ and $U_j$ is formed by multipliers 124. Such product will eventually result in a signal which will represent the individual weighting elements $Q_{ij}$. The product $V_i U_j$ is subtracted from a signal representing the value of $Q_{ij}$ at the previous sampling interval summer 126. It should be noted that sample interval delay 128 could be realized with a charge coupled device such as a bucket brigade delay line if the signals $Q_{ij}$ were analog or with a set of digital shift registers if the signals $Q_{ij}$ were of a digital format.

Initially (K=0), this circuit can begin operation with the Q matrix being equal to an identity matrix.

Consideration of the above indicates that the subject invention provides for the:

1. A space-time spread-spectrum adaptive array, structured to enhance virtually all resolvable multipath components of the desired signal as well as to null and reject externally generated interference and jamming, thereby providing a method of achieving more reliable spread-spectrum signal detection of slowly fading multipath signals. The associated method of space-time signal tracking permits the minimization of loss of synchronization and avoids the attendant interruptions of communication.
2. The simultaneous acquisiton and enhancement of the various resolvable components of the desired signal in spite of unknown directions of arrival and differences between these directions of arrival.
3. Feasible signal acquisition and enhancement for signals within a delay-frequency window such that the acceptable time and frequency uncertainties are about one hundred pseudo-noise chips delay and several hundred hertz, respectively. A tolerance for greater uncertainties occurs as the received signal-to-thermal-noise ratio increases beyond the zero db level.
4. The avoidance of a loss of signal energy due to reduced antenna gain in the signal direction, a problem occurring during certain multipath conditions with adaptive array techniques of known prior art, by the new space-time signal processing method.
5. A conferencing capability such that signals from other users in a communication network, where all users employ the same spread-spectrum code, can be processed and detected simultaneously. Like multipath, the requirement for signal resolution is a time of arrival difference of at least one code chip.
6. An essential compatibility with optimal detection of multipath signals. Optimal detection system performance requires adapting to the received signal, i.e., forming a filter matched to the received multipath and thus utilizing all significant resolvable multipath components to improve detection.

What is claimed as new and desired to be secured by Letters Patent of the United States is:

1. An antenna array adaptive signal processor for improving the signal-to-noise ratio of a received signal containing a direct component and multipath components in an unknown electromagnetic environment comprising:

signal conducting means for carrying a plurality of signals from antenna elements along a plurality of preselected paths, filter means connected between said array signal and each of said signal conducting means to minimize the mean square error of said array signal as compared with a reference signal, whereby said array signal is formed in a selected look direction, and adaptive channel estimating means for generating said reference signal so that said reference signal includes the direct component as well as the multipath components of the received signal.

2. The antenna array adaptive signal processor as set forth in claim 1 wherein the filter means further comprises:

a plurality of a first multiplication means to form a product of each antenna signal, $r_i$, with a complex conjugate of each filter weight, $w_i^*$, a summing means to form the array signal, y, from an addition of each said product corresponding to each separate antenna element, a subtracting means for determining an error feedback signal, E, by taking the difference of said reference signal, $s_o$, and said array signal, y, a plurality of second multiplication means for determining an integration input signal corresponding to each antenna element, as a product of each antenna signal, $r_i$, and a complex conjugate of the error feedback signal, $E^*$, a plurality of integration means for integrating each integration signal in order to form a filter weight, $w_i$, whose complex conjugate can be used as a multiplier at each of said first multiplication means.

3. The antenna array adaptive signal processor as set forth in claim 1, wherein the adaptive channel estimating means further comprises:

a local PN code generating means to generate a preselected PN code that is known to have been transmitted, a tapped delay line for receiving the PN code generated by said PN code generating means, a plurality of taps located on said tapped delay line to carry a plurality of tapped delay line signals representing the PN code, each of said signals, $X_1$, being delayed in time from one another, a plurality of first multiplication means to form a product of each said signal, $X_1$, with a complex conjugate of each tap gain weight, $g_1^*$, a summing means to form the reference signal, $s_o$, from an addition of each of said products corresponding to each separate tap of said delay line, a substracting means for determining an error feedback signal, E, by taking the difference of said reference signal, $S_o$, and said array signal, y, a plurality of second multiplication means for determining an integration input signal corresponding to each tap of said delay line, as a product of each tap delay line signal, $X_1$, and a complex conjugate of the error feedback signal, $E^*$, a plurality of integration means for integrating each integration input signal in order to form a tap gain weight, $g_1$, whose complex conjugate can be used as a multiplier at each of said first multiplication means.

4. The antenna array adaptive signal processor as set forth in claim 1, wherein the adaptive channel estimating means further comprises:

a local PN code generating means to generate a preselected PN code that is known to have been transmitted, a first tapped delay line for receiving the PN code generated by said PN code generating means, a plurality of taps located on said first tapped delay line to carry a plurality of tapped delay line signals representing the PN code, each of said signals being delayed in time from one another, a switching means for separately selecting one of said signals present on one of the taps of said first tapped delay line, a second tapped delay line for receiving a signal selected by said switching means, a plurality of taps located on said second tapped delay line to carry a plurality of tapped delay line signals representing the PN code, each of said signals, $X_1$, being delayed in time from one another, a plurality of first multiplication means to form a product of each said signal, $X_1$, with a complex conjugate of each tap gain weight, $g_1^*$, a plurality of subtracting means each forming a separate loop error feedback signal, $E_1$, corresponding to each tap of said second delay line by taking the difference of said product and said array signal, y, a plurality of second multiplication means for determining an integration input signal corresponding to each tap of said second delay line, as a product of each tap delay line signal $X_1$, and a complex conjugate of each separate loop error feedback signal, $E_1^*$, a plurality of integration means for integrating each integration input signal in order to form a tap gain weight, $g_1$, whose complex conjugate can be used as a multiplier at each of said first multiplication means, a threshold detector for comparing a squared magnitude of an adaptive tap gain weight with a mean square value of all the tap gain weights so as to determine which tap gain weights exceed said mean square value, a plurality of gates each accepting a separate loop error feedback signal, $E_1$, a summing means for determining a total error feedback signal, E, by forming the sum of all said separate loop errror feedback signals which are allowed to pass through said gates; and gate control means allowing each gate to pass its separate loop error feedback signal to said summing means when the squared magnitude of its adaptive weight exceeds the mean square value of all the tap gain weights.

5. The antenna array adaptive signal processor as set forth in claim 2, wherein the adaptive channel estimating means further comprises:

a local PN code generating means to generate a preselected PN code that is known to have been transmitted, a tapped delay line for receiving the PN code generated by said PN code generating means, a plurality of taps located on said tapped delay line to carry a plurality of tapped delay line signals representing the PN code, each of said signals, $X_1$, being delayed in time from one another, a plurality of third multiplication means to form a product of each said signal, $X_1$, with a complex conjugate of each tap gain weight, $g_1^*$, a second summing means to form the reference signal, $s_o$, from an addition of each of said products corresponding to each separate tap of said delay line, said subtracting means for determining an error feedback signal, E, by taking the difference of said reference signal, $s_o$, and said array signal, y, a plurality of second multiplication means for determining an integration input signal corresponding to each tap of said delay line signal, $X_1$, and a complex conjugate of the error feedback signal, $E^*$, a plurality of second integration means for integrating each integration input signal in order to form a tap gain weight, $g_1$, whose complex conjugate can be used as a multiplier at each of said third multiplication means.

6. The antenna array adaptive signal processor as set forth in claim 2, wherein the adaptive channel estimating means further comprises:

a local PN code generating means to generate a preselected PN code that is known to have been transmitted.

a first tapped delay line for receiving the PN code generated by said PN code generating means, a plurality of taps located on said first tapped delay line to carry a plurality of tapped delay line signals representing the PN code, each of said signals being delayed in time from one another, a switching means for separately selecting one of said signals present on one of the taps of said first tapped delay line, a second tapped delay line for receiving a signal selected by said switching means, a plurality of taps located on said second tapped delay line to carry a plurality of tapped delay line signals representing the PN code, each of said signals, $X_1$, being delayed in time from one another, a plurality of first multiplication means to form a product of each said signal, $X_1$, with a complex conjugate of each tap gain weight, $g_1^*$, a plurality of subtracting means each forming a separate loop error feedback signal, $E_1$, corresponding to each tap of said second delay line by taking the difference of said product and said array signal, y, a plurality of second multiplication means for determining an integration input signal corresponding to each tap of said second delay line, as a product of each tap delay line signal $X_1$, and a complex conjugate of each separate loop error feedback signal, $E_1^*$, a plurality of integration means for integrating each integration input signal in order to form a tap gain weight, $g_1$, whose complex conjugate can be used as a multiplier at each of said first multiplication means, a threshold detector for comparing a squared magnitude of an adaptive tap gain weight with a mean square value of all the tap gain weights so as to determine which tap gain weights exceed said mean square value, a plurality of gates each accepting a separate loop error feedback signal, $E_1$, a summing means for determining a total error feedback signal, E, by forming the sum of all said separate loop error feedback signals which are allowed to pass through said gates; and gate control means allowing each gate to pass its separate loop error feedback signal to said summing means when the squared magnitude of its adaptive weight exceeds the mean square value of all the tap gain weights.

* * * * *